(12) United States Patent
Schubert et al.

(10) Patent No.: US 11,776,335 B1
(45) Date of Patent: Oct. 3, 2023

(54) VEHICLE CONNECTIVITY FOR ENHANCING POWERED TOOL OPERATION

(71) Applicant: FORD GLOBAL TECHNOLOGIES, LLC, Dearborn, MI (US)

(72) Inventors: Jochen Schubert, Farmington Hills, MI (US); Jeremy Lerner, Southfield, MI (US); Taylor Hawley, Oak Park, MI (US); Scott Huggins, Novi, MI (US); Danielle Rosenblatt, Madison Heights, MI (US); Ali Abdallah, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 17/750,514

(22) Filed: May 23, 2022

(51) Int. Cl.
*G07C 9/00* (2020.01)
*B60L 1/00* (2006.01)
*G07C 9/20* (2020.01)
*B25F 5/00* (2006.01)

(52) U.S. Cl.
CPC ............ *G07C 9/00309* (2013.01); *B25F 5/00* (2013.01); *B60L 1/00* (2013.01); *G07C 9/20* (2020.01); *G07C 2009/00507* (2013.01)

(58) Field of Classification Search
None
See application file for complete search history.

(56) References Cited

U.S. PATENT DOCUMENTS

| | | | |
|---|---|---|---|
| 8,536,734 B2 * | 9/2013 | Johnson | H02M 7/483 307/77 |
| 9,584,600 B2 | 2/2017 | Yun | |
| 9,783,066 B2 | 10/2017 | Kim et al. | |
| 10,872,540 B2 | 12/2020 | Steketee et al. | |
| 11,190,936 B2 | 11/2021 | Bolotin et al. | |
| 2022/0068207 A1 * | 3/2022 | Liu | G09G 3/3225 |

FOREIGN PATENT DOCUMENTS

WO 2021030549 A1 2/2021

* cited by examiner

*Primary Examiner* — Carlos Garcia
(74) *Attorney, Agent, or Firm* — Brooks Kushman P.C.

(57) ABSTRACT

Enhancing operation of powered tools is provided. Access permissions for tools and access devices are stored to in vehicle memory. Presence of a tool within proximity to the vehicle is detected. Presence of access devices configured to provide access to the vehicle are detected utilizing passive access functionality of the vehicle. Access to an auxiliary power source of the vehicle is allowed for powering the tool responsive to the access permissions granting access due to the presence of the access devices.

20 Claims, 7 Drawing Sheets

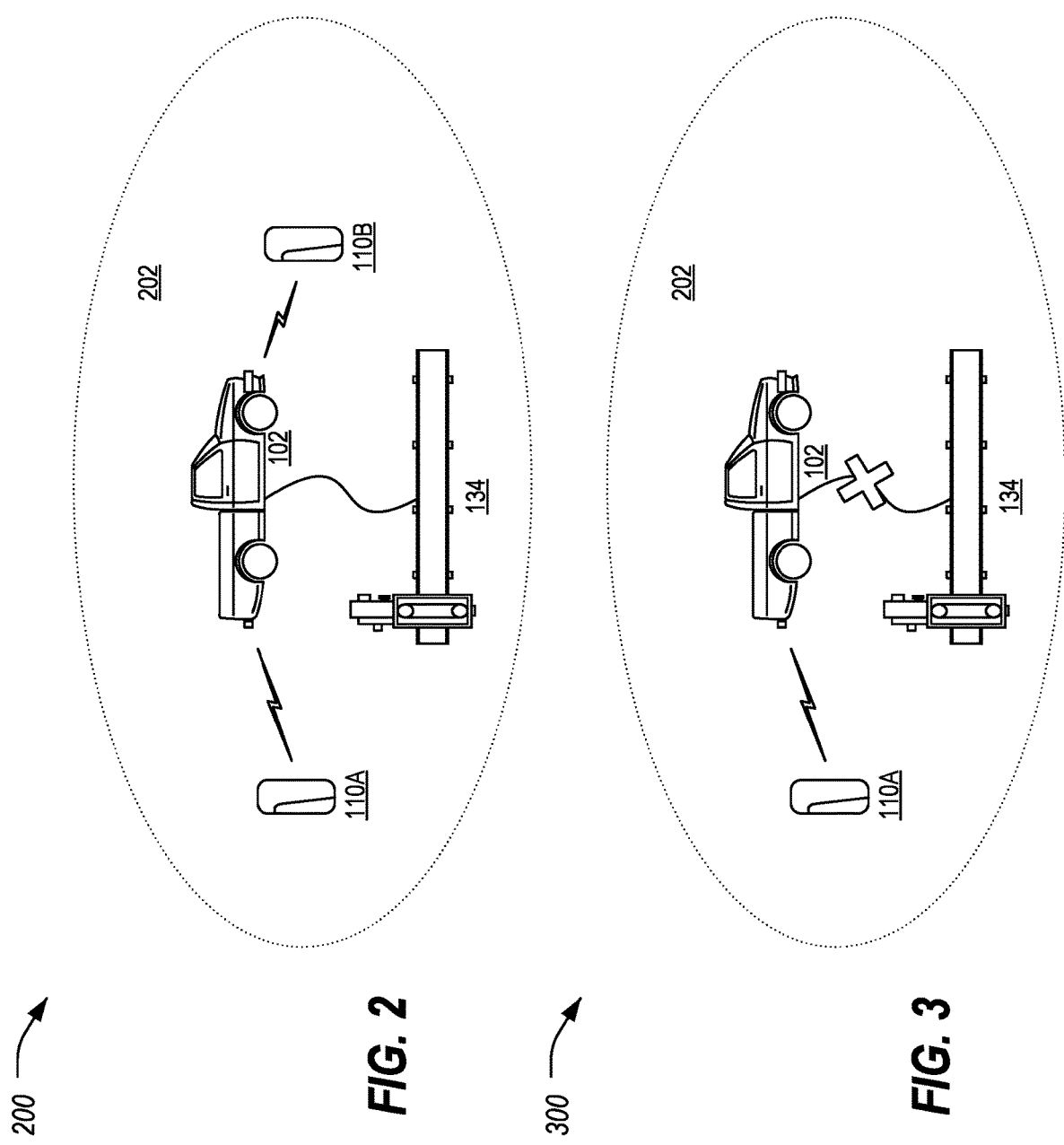

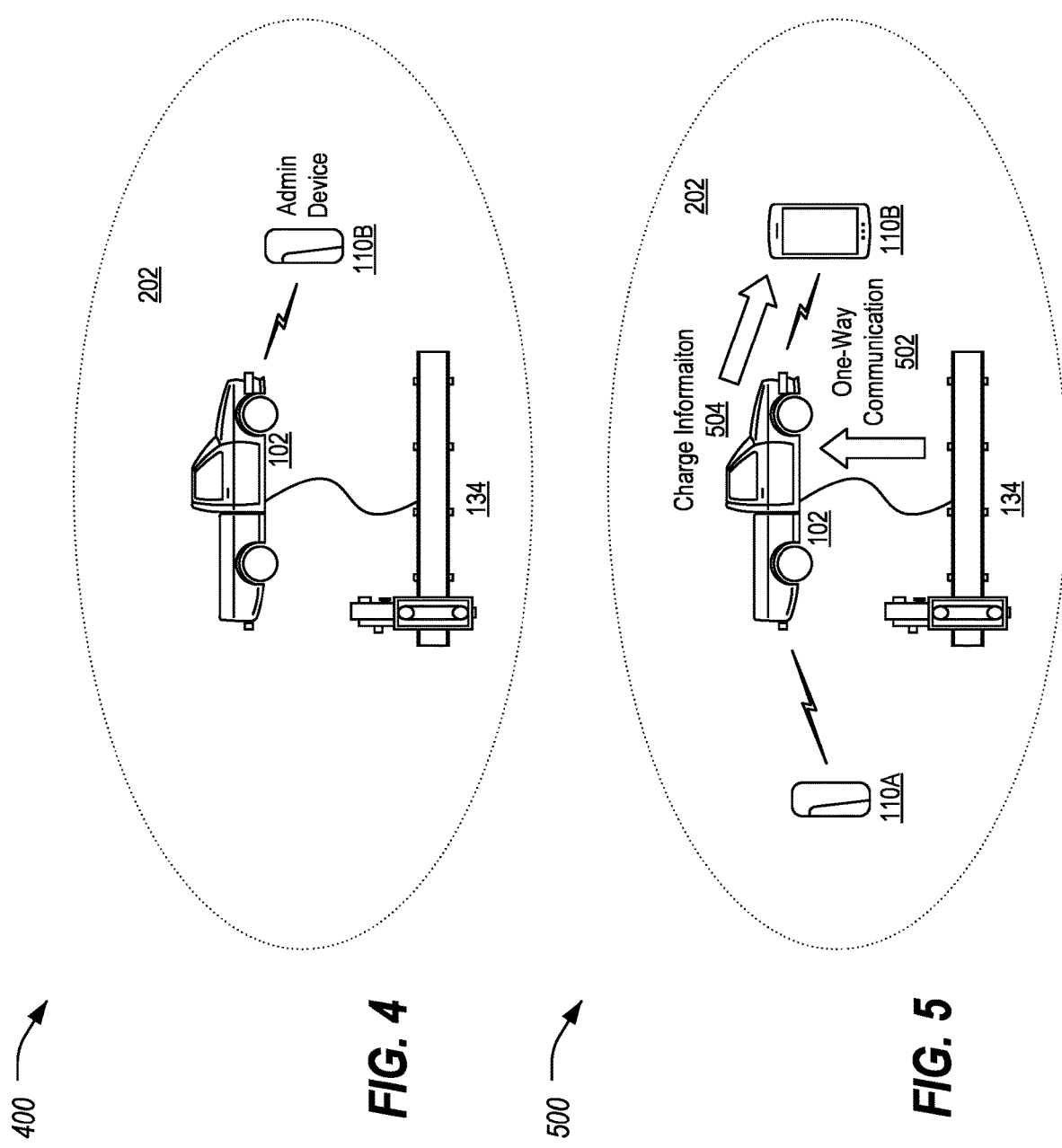

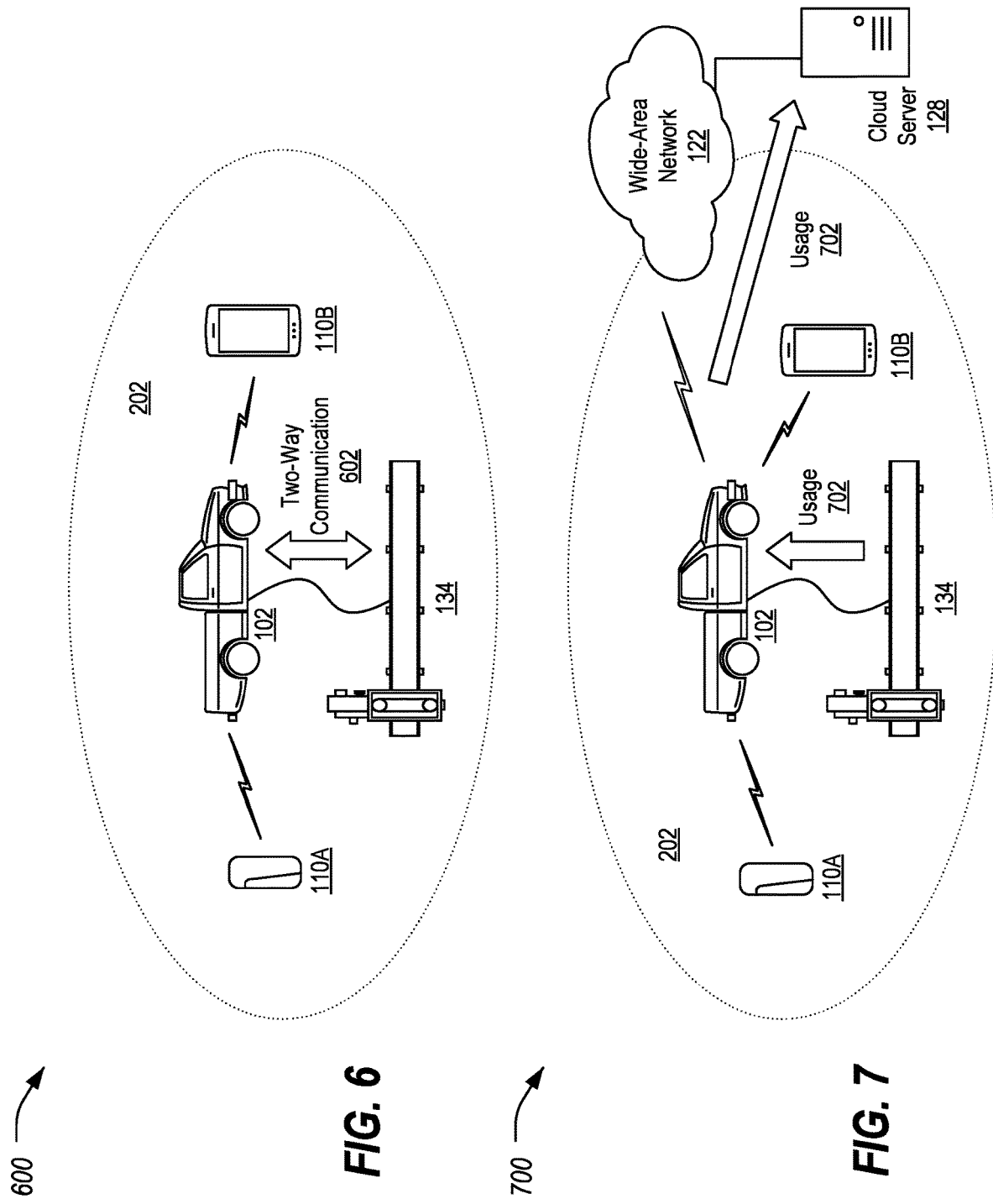

VEHICLE CONNECTIVITY FOR ENHANCING POWERED TOOL OPERATION

TECHNICAL FIELD

Aspects of the disclosure generally relate to vehicle connectivity for enhancing operation of powered tools.

BACKGROUND

Vehicle key fobs may be used to allow a user to gain access to a vehicle. Some fob devices operate such that when a button is pressed on the fob, the device sends a code to the vehicle to instruct the vehicle to unlock the vehicle. Passive entry passive start (PEPS) key fobs operate to provide response to a challenge pulse train sent by the vehicle, where if a proper response is received by the vehicle then the door may be unlocked by a user grasping the door handle.

Phone-as-a-key (PaaK) systems are being introduced to allow users to utilize their phones to unlock a vehicle without requiring a key fob device. These systems may operate similar to a key fob, but where the phone communicates with the vehicle over BLUETOOTH LOW ENERGY (BLE) or Ultra-Wide Band (UWB) or other mobile device wireless technologies.

Some vehicles are capable of providing power to tools or other devices. In some examples, vehicles include power generators which may be used to supply electricity to plugged in devices. In other examples, electric vehicles may use their battery capabilities to provide power to the tools or other devices.

SUMMARY

In a first illustrative example, a system for enhancing operation of powered tools is provided. The system includes a memory of a vehicle configured to store access permissions for tools and access devices. The system further includes an auxiliary power source of the vehicle configured to provide power the tools. The system further includes a controller of the vehicle, programmed to detect presence of a tool within proximity to the vehicle, detect presence of access devices configured to provide access to the vehicle, utilizing passive access functionality of the vehicle, and allow access to the auxiliary power source for powering the tool responsive to the access permissions granting access due to the presence of the access devices.

In a second illustrative example, a method for enhancing operation of powered tools is provided. Access permissions for tools and access devices are stored to a memory of a vehicle. Presence of a tool within proximity to the vehicle is detected. Presence of access devices configured to provide access to the vehicle are detected utilizing passive access functionality of the vehicle. Access to an auxiliary power source of the vehicle is allowed for powering the tool responsive to the access permissions granting access due to the presence of the access devices.

In a third illustrative example, a non-transitory computer-readable medium includes instructions for enhancing operation of powered tools that, when executed by a controller of a vehicle, cause the vehicle to perform operations including to store access permissions for tools and access devices to a memory of a vehicle; detect presence of a tool within proximity to the vehicle; detect presence of access devices configured to provide access to the vehicle, utilizing passive access functionality of the vehicle; and allow access to an auxiliary power source of the vehicle for powering the tool responsive to the access permissions granting access due to the presence of the access devices.

BRIEF DESCRIPTION OF THE DRAWINGS

FIG. 2 illustrates an example generator utilization scenario for a tool in a configuration where the presence of two or more access devices are required to enable full power output to the tool;

FIG. 3 illustrates an example generator utilization scenario for the tool in a configuration where only one access device is present for the tool configured at the vehicle to require presence of two or more access devices;

FIG. 4 illustrates an example generator utilization scenario for the tool in a configuration where an administrator access device is present for the tool configured at the vehicle to require presence of two or more access devices;

FIG. 5 illustrates an example generator utilization scenario for a tool having one-way communication capabilities with the vehicle;

FIG. 6 illustrates an example generator utilization scenario for a tool having two-way communication capabilities with the vehicle;

FIG. 7 illustrates an example generator utilization scenario for the cloud server tracking usage of a tool;

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Vehicles with power ports are increasingly being utilized at construction sites or other locations where the power grid is not readily available. However, there are many opportunities to enhance the power supply operation based on the increasingly intelligent vehicles and new technologies such as phone as a key. Auxiliary power sources used on sites for running power tools may be used to enforce the presence of access devices to control power output. By utilizing existing PEPS and PaaK features found in vehicles that contain auxiliary power sources, power output may gain flexible permissions controlled by a foreman or other administrative user to enforce safety guidelines. Further, if the tools include intelligent communications features, additional applications with the vehicle can utilize the connectivity to enhance tool operation.

Figure 1:
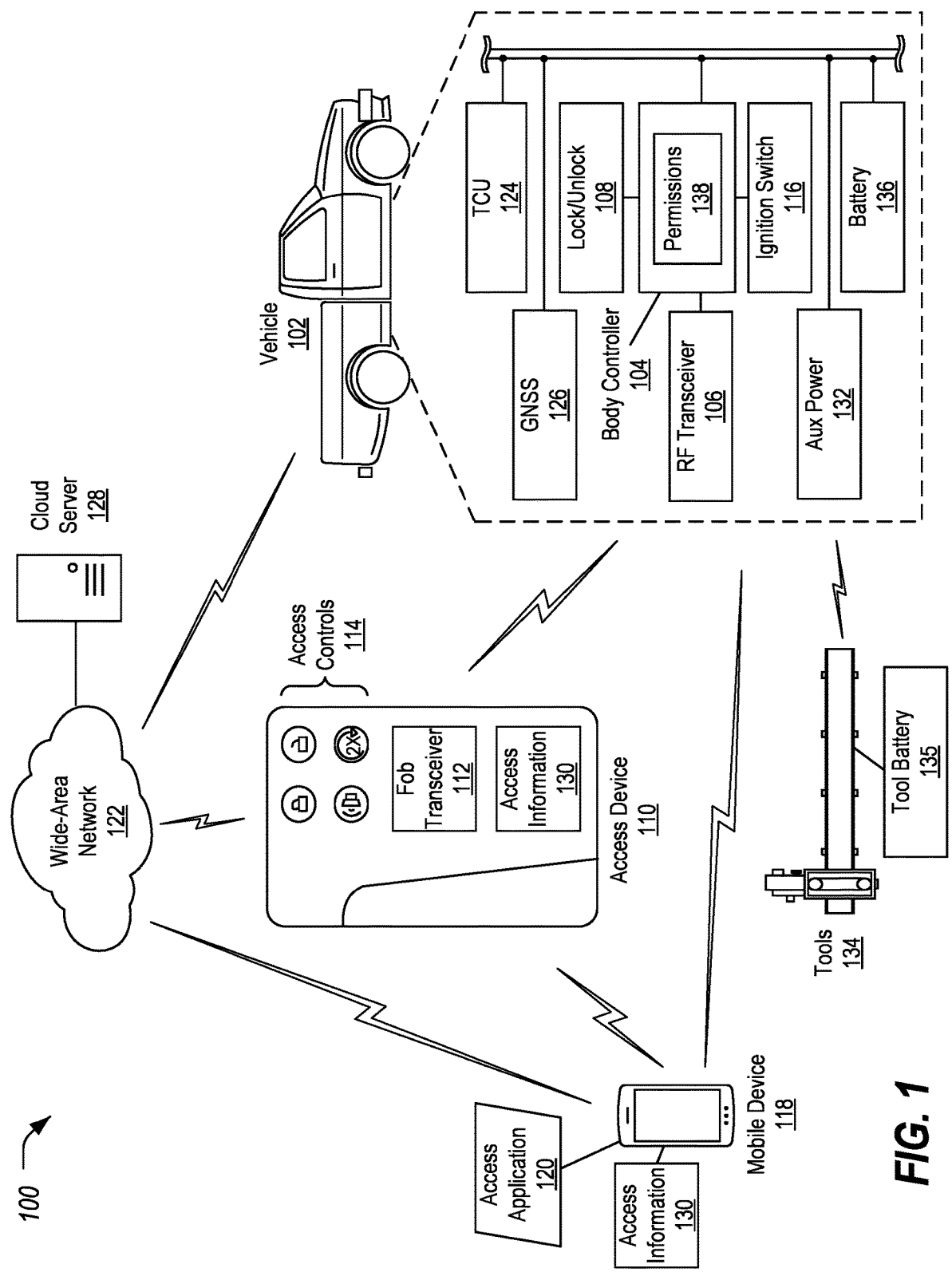
FIG. 1 illustrates an example system implementing access device power supply operation from vehicles.

FIG. 1 illustrates an example system 100 implementing access device 110 power supply operation from vehicles 102. The system 100 may include vehicles 102, access devices 110 such as mobile devices 118, and cloud servers 128. While one of each is shown for simplicity, the system 100 may include various quantities of vehicles 102, access devices 110, and cloud server 128. The vehicles 102 may include auxiliary power sources 132 configured to provide power to various tools 134. The access devices 110 may be used to facilitate access to the vehicles 102. The access devices 110 may also be used to support intelligent features with respect to the vehicles 102 providing power to the tools 134 and to the charging of tool batteries 135 of the tools 134 by the vehicles 102. The cloud server 128 may also be configured to support the authorization and logging of tool 134 usage from the vehicles 102.

The vehicle 102 may include a body controller 104 in communication with a radio frequency (RF) transceiver 106. A lock/unlock mechanism 108 may be operably coupled to the body controller 104. The body controller 104 may be configured to control the lock/unlock mechanism 108 to unlock/lock doors of the vehicle 102 in response to wireless signals received by the body controller 104 from the RF transceiver 106. The RF transceiver 106 may operate using various wireless protocols, such as Wi-Fi, UWB, BLUETOOTH, BLE, and/or near field communication (NFC), as some non-limiting examples.

The vehicle 102 may also include an auxiliary power source 132. In some examples, the auxiliary power source 132 may be an onboard generator configured to generate electricity through the consumption of gasoline, diesel, biodiesel or other fuel. In another example, the auxiliary power source 132 may be an access to a battery 136 of the vehicle 102.

The access device 110 may be an example of a device configured to be in wireless communication with the vehicle 102. The access device 110 may include an access transceiver 112 configured to communicate access information 130 to the RF transceiver 106. For instance, the access device 110 may include one or more access controls 114, such as lock and unlock buttons. Accordingly, the access device 110 may send lock, unlock, or other commands to the body controller 104 to control the lock/unlock mechanism 108 to lock or unlock the doors of the vehicle 102 (as well as the ignition switch 116). The access device 110 may be implemented in connection with a base remote entry system, a PEPS system or a passive anti-theft system (PATS). With the PEPS system, the body controller 104 may control the lock/unlock mechanism 108 to unlock the door in response to the body controller 104 determining that the access device 110 is a predetermined distance away from the vehicle 102. In such a case, the access device 110 automatically (or passively) transmits encrypted RF signals (e.g., without user intervention) in order for the body controller 104 to decrypt (or decode) the RF signals and to determine whether the access device 110 is within the predetermined distance and is authorized. The access device 110 may also operate using various wireless protocols, such as Wi-Fi, UWB, BLUETOOTH, BLE, and/or NFC, as some non-limiting examples.

The mobile device 118 may be an example of a specific type of access device 110 configured to be in wireless communication with the vehicle 102. The mobile device 118 may include an access application 120 installed to a memory of the mobile device 118. The access application 120 may allow the user to utilize the mobile device 118 as an access device 110 to provide entry to the vehicle 102. In addition, the access application 120 may be able to receive information from the vehicle 102, e.g., transmitted from the vehicle 102 over a wide-area network 122 using a telematics control unit (TCU) 124. In an example, the access application 120 may allow the user to receive from the vehicle 102 information indicative of the position of the vehicle 102, which may be determined by the vehicle 102 using a global navigation satellite system (GNSS) controller 126. The mobile device 118 may also operate using various wireless protocols, such as Wi-Fi, UWB, BLUETOOTH, BLE, and/or NFC, as some non-limiting examples.

The cloud servers 128 may also be a type of device configured to be in wireless communication with the vehicles 102, access devices 110, and/or mobile devices 118 of the system 100. In many cases, the cloud servers 128 may be in communication with the other devices of the system 100 via the wide-area network 122.

As discussed in further detail with respect to FIGS. 2-10, the vehicles 102, mobile devices 118, access devices 110, tools 134, and cloud server 128 may support intelligent features with respect to the vehicles 102 providing power to the tools 134, to the charging of the tools 134 by the vehicles 102, and the logging of tool 134 usage from the vehicles 102. These features may be enabled using the same functionality used to provide access to the vehicles 102 via the access devices 110. For example, the specific access devices 110 that are identified by the body controller 104 may be used to enable, disable, notify, and/or track the charging and/or other usage of the tools 134.

The body controller 104 may be configured to maintain permissions 138 to support the enabling, disabling, notifying, and/or tracking of use of the auxiliary power source 132 by the tools 134 (or use of the tools 134 themselves). In an example, the permissions 138 may include identifiers of access devices 110 that are required to be present to allow the auxiliary power source 132 to be utilized. In another example, the permissions 138 may include identifiers of tools 134 that are authorized (e.g., via the cloud server 128) to utilize the auxiliary power source 132.

FIG. 2 illustrates an example generator utilization scenario 200 for a tool 134 in a configuration where the presence of two or more access devices 110 are required to enable full power output to the tool 134. In an example, the requirement for multiple access devices 110 to be present within a passive key detection range 202 may be programmed to the permissions 138 of the vehicle 102 via job foreman or other administrative user (e.g., utilizing the mobile device 118 of that user). The permissions 138 may specify, for example, that the presence of the two or more access devices 110 is required before enabling full power output of the auxiliary power source 132 to the tool 134.

As the two or more access devices 110 are detected within a specific range (as shown 110A and 110B), the auxiliary power sources 132 may utilize their full output capacity and run circular saws, miter saws, jackhammers, air compressors, angle grinders, etc. that have higher wattage requirements. These tools 134 present greater operational requirement and therefore could require that more than one worker is present before operating them.

FIG. 3 illustrates an example generator utilization scenario 300 for the tool 134 in a configuration where only one access device 110 is present for the tool 134 configured at the vehicle 102 to require presence of two or more access devices 110. As only a single access device 110 is present within the passive key detection range 202 of the vehicle 102, the auxiliary power source 132 may be disabled or limited to a predefined single-user maximum power output (e.g., 500 W of output to power job lights or tool 134 chargers, but not enough to power for larger tools 134 that should have more than one operator present). and The vehicles 102 may be configured to send a notification to foreman or other administrative user of the vehicle 102 if an attempt is made to exceed this power usage. This notification may identify the operator using by the access information 130 of the access device 110 present when the request for power was made. The notification may indicate that the operator so identified attempted to utilize high-wattage tools 134 without following the usage guidelines, and/or that an additional operator should be dispatched to the site to aid the sole operator who is currently present. The vehicle 102 may identify who is an administrative user via the permissions 138. For instance, the access devices 110 of administrative users may include an administrator flag in the permissions 138, while the access devices 110 of non-administrative users may lack that administrator flag.

The vehicle 102 may utilize various components to perform the limiting of power to the tools 134 in the low-power mode. In an example, power output may be limited via circuit breakers, shutting off all power output when wattage is detected to exceed the configured limit, or other mechanisms to limit the amount of power that can be supplied by the auxiliary power source 132.

FIG. 4 illustrates an example generator utilization scenario 400 for the tool 134 in a configuration where an administrator access device 110 is present for the tool 134 configured at the vehicle 102 to require presence of two or more access devices 110. As a variation on the multiple access device 110 requirement, responsive to the admin device, such as the foreman's access device 110 with that corresponding access information 130 being present at the vehicle 102 within the passive key detection range 202, in some implementations that single access device 110 may grant access to the tools 134 despite the lack of presence of multiple access devices 110 (e.g., if the permissions 138 allow for the admin user to override and allow the access). This may be useful, for example if the administrative user manually identifies adequate users are present, even if those users lack access devices 110.

FIG. 5 illustrates an example generator utilization scenario 500 for a tool 134 having one-way communication 502 capabilities with the vehicle 102. In an example, the one-way communication 502 may include the vehicle 102 measuring the state of charge via the power cord between the tool 134 and the auxiliary power source 132. For instance, the state of charge may be inferred based on the voltage level or other characteristics of the tool battery 135 of the tool 134 in combination with a lookup table of those characteristics to the state of charge. In another example, the one-way communication 502 may be performed through a connection separate from the power connection, such as a Wi-Fi, UWB, BLUETOOTH, BLE, and/or NFC communication to the vehicle 102. For instance, the tool 134 may be configured to communicate its state of charge level to the vehicle 102 over the separate connection.

Additional aspects may be enabled by the user of the one-way communication 502 between the tool 134 and the vehicle 102. In an example, the vehicle 102 may be configured to share charging information 504 with the access device 110 (provided that the access device 110 is a mobile device 118 or other device capable of receiving the charging information 504). This charging information 504 may include, as some examples, charging time remaining, and/or usage estimates or metrics when the auxiliary power source 132 is used to charge up power tool batteries 135.

When the tool battery 135 of the tool 134 is plugged into the vehicle 102, the vehicle 102 may track the state of charge when the tool battery 135 is first plugged in and for how long the tool battery 135 was being used. For example, if a power drill tool battery 135 is at 100% state of charge, is taken off the auxiliary power source 132 for three hours, and is returned to the auxiliary power source 132 with a 40% state of charge, the vehicle 102 may roughly estimate the amount of tool battery 135 state of charge used per unit time, so that the users of the tools 134 may be sent notifications to their mobile devices 118 (e.g., from the TCU 124 of the he vehicle 102) as to an estimated time their tool batteries 135 may be running out, based on historical usage and charging information.

Further, the vehicle 102 may be configured to send the access devices 110 of the users notifications about the expected tool 134 runtime remaining based on current power output. For instance, if a construction team is using a certain number of tools 134, the rate of power draw may be tracked over a test period of time (e.g., 30 minutes) by the vehicle 102 to estimate the amount of time it would take for the battery 136 or generator of the vehicle 102 to run dry. These notifications may allow a site foreman or other user to plan appropriate actions to avoid delaying further use of the tools 134 (e.g., fuel up the vehicle 102, bring an electric vehicle (EV) charger, etc.).

In some examples, machine learning or other techniques may be used based on the tool 134 usage to determine the expected power usage of the tools 134 based on historical behavior. This may allow the vehicle 102 to provide notifications based on the pattern of usage of the tools 134, as opposed to estimating the time to empty based on the current draw from the auxiliary power source 132 (as not every tool 134 plugged in may be in continuous use).

FIG. 6 illustrates an example generator utilization scenario 600 for a tool 134 having two-way communication 602 capabilities with the vehicle 102. In an example, the two-way communication 602 may include communicating an identifier via the power cord between the tool 134 and the auxiliary power source 132. In another example, the two-way communication 602 may be performed through a connection separate from the power connection, such as a BLUETOOTH or Wi-Fi connection to the vehicle 102.

Additional aspects may be enabled by the user of the two-way communication 602 between the tool 134 and the vehicle 102. In one example, the vehicle 102 may receive the tool 134 identifier via the two-way communication 602. Specific access devices 110 may therefore be authorized for specific tools 134, so only when one of a specific set of access devices 110 is within the passive key detection range 202 to the vehicle 102 will those certain tools 134 be allowed to be powered via the auxiliary power source 132. For example, five worker access devices 110 could be authorized for using a jackhammer tool 134, but one of those workers' access devices 110 must be within the passive key detection range 202 of the vehicle 102 to allow the jackhammer tool 134 to receive power from the auxiliary power source 132.

In another aspect of the system 100, the vehicle 102 may be configured to act as a mobile authorization server, where the tools 134 must be within the passive key detection range 202 of the vehicle 102 to allow for their usage. This may be based on Wi-Fi, UWB, BLUETOOTH, BLE, and/or NFC connection between the tools 134 and the vehicle 102, where if the tools 134 are removed from the construction site as being outside the passive key detection range 202, then those tools 134 may no longer be able to operate. This may accordingly limit the opportunity for tool 134 theft or unauthorized tool 134 use.

In an example, an administrative user of the vehicle 102 or of the access devices 110 (e.g., the foreman, a fleet manager, etc.) may generally be the administrator who can set tool 134 authorizations for other access devices 110. For instance, the administrative user may utilize his or her access device 110 to communicate to the vehicle 102 which tools 134 are authorized for use based on being within proximity to the vehicle 102 (e.g., within the passive key detection range 202, within BLUETOOTH range, etc.). The tools 134 may be determined based on identifiers broadcast by the tools 134, which may be maintained by the vehicle 102 and sent to the access device 110 for approval and/or disapproval as being authorized tools 134. In another example, the user may be able to enter authorized identifiers into the access device 110 which in turn may communicate those authorized identifiers of the tools 134 to the vehicle 102. Responsive to receipt of an identifier from a tool 134 the vehicle 102 may ensure that the correct access devices 110 and/or correct quantity of the access devices 110 are present and, if so, may send a reply to the tool 134 allowing the tool 134 to function and/or charge from the auxiliary power source 132.

FIG. 7 illustrates an example generator utilization scenario 700 for the cloud server 128 tracking usage 702 of a tool 134. In another aspect of the system 100, the usage 702 for each tool 134 may be logged by the vehicle 102 and sent to the cloud server 128. In an example, the tools 134 may be rented out or otherwise linked to vehicles 102 with auxiliary power sources 132 who are configured to charge only for specific tool 134 usage 702. The identifiers of the tools 134 may be received to the vehicle 102, as noted above, when plugged in to the vehicle 102. Based on these identifiers and the power received via the auxiliary power source 132, the total usage 702 per rental event may be tracked and summed to allow for billing, per unit time, per tool 134.

Figure 8:
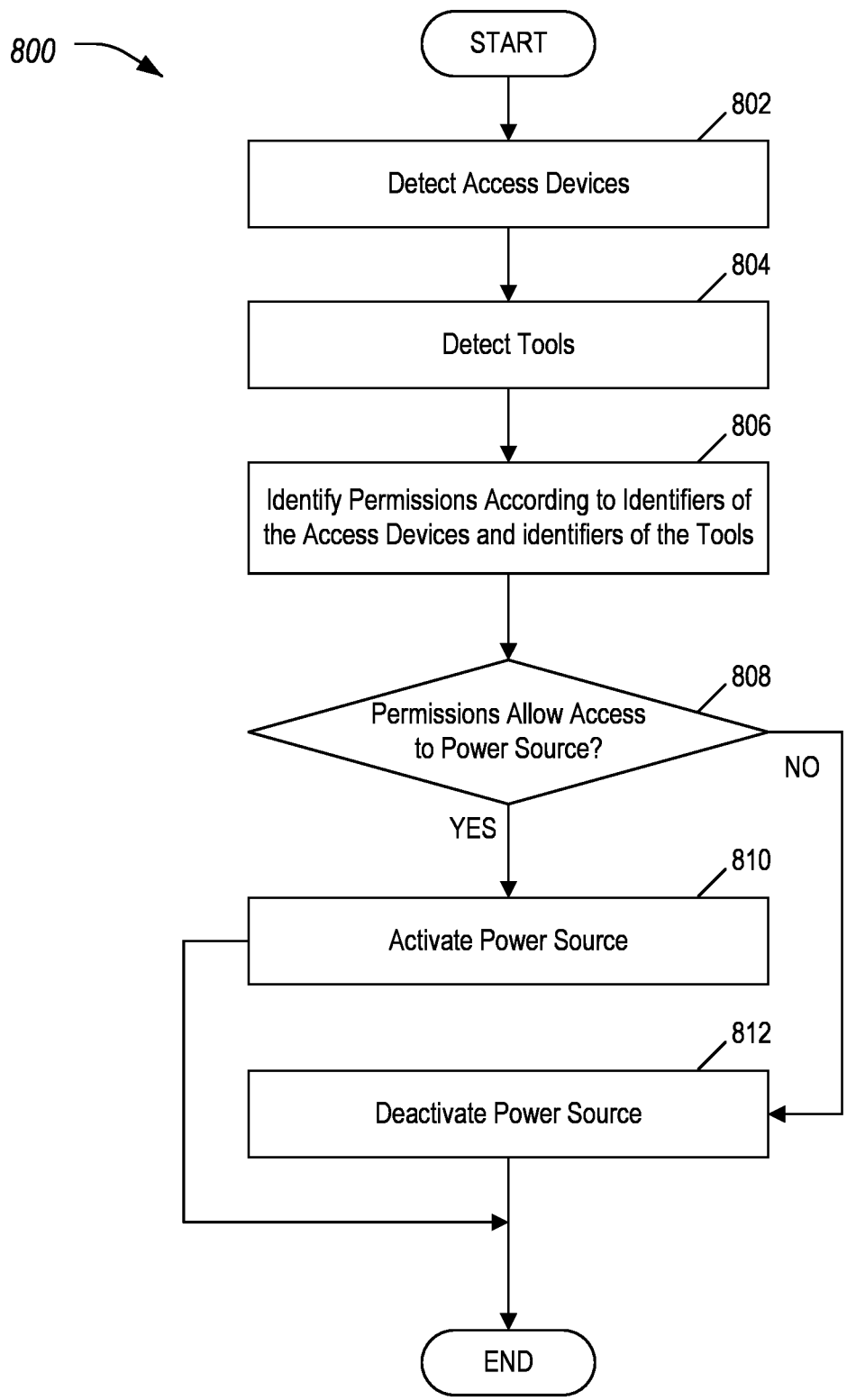
FIG. 8 illustrates an example process for operation of the vehicle to provide enhancing operation of the powered tools.

FIG. 8 illustrates an example process 800 for operation of the vehicle 102 to provide enhancing operation of the powered tools 134. In an example, the process 800 may be performed by the body controller 104 in the context of the components of the system 100.

At operation 802, the body controller 104 detects access devices 110. In an example the body controller 104 may detect the presence of access device 110 within the passive key detection range 202 using the passive key entry functionality of the body controller 104. For instance, the body controller 104 may utilize utilizing existing PEPS and PaaK features found in the vehicle 102 to identify whether access devices 110 such as key fobs or mobile devices 118 are present within the passive key detection range 202. Additionally, access information 130 may be determined from the detected access devices 110, such as unique identifiers of the access devices 110, also using the existing PEPS and/or PaaK functionality.

At operation 804, the body controller 104 detects tools 134. In an example, the body controller 104 may detect the presence of a load attached to the auxiliary power source 132. In such an example, a type of the tool 134 may be inferred by the load. Or, the presence of a tool 134 in general may instead be indicated, without a specific identification. In another example, the body controller 104 may receive an identifier of the tool 134 over the wires power connection between the auxiliary power source 132 and the tool 134. In yet another example, the body controller 104 may wirelessly receive an identifier of the tool 134, e.g., over Wi-Fi, UWB, BLUETOOTH, BLE, and/or NFC or other wireless technology.

At operation 806, the body controller 104 identifies permissions 138 according to the identifiers of the access devices 110 and any identifiers of the tools 134. The permissions 138 may indicate aspects of whether to allow or disallow user of the auxiliary power source 132 based on the access devices 110 and/or the tools 134 that are detected. In one example, the permissions 138 may require multiple access devices 110 to be present to allow for powering of tools 134 via the auxiliary power source 132. In another example, the permissions 138 may allow powering of tools 134 up to a first predefined threshold power if a single access device 110 is detected but may allow powering of the tools 134 up to a second, higher predefined threshold power if two or more access devices 110 are detected. In yet another example, the permissions 138 may allow powering of tools 134 if a single administrator access device 110 is detected.

In still other examples, the permission 138 may include a mapping of identifiers of access devices 110 to identifiers of tools 134. For instance, specific access devices 110 could be authorized for specific tools 134, so only when one of a specific set of access devices 110 is nearby to the vehicle 102 will those tools 134 be allowed to activate. For example, a set of workers could be authorized for using a jackhammer tool 134, and one of those workers' phones must be near the vehicle 102 within the passive key detection range 202 to allow the jackhammer tool 134 to receive power via the auxiliary power source 132.

At operation 808, the body controller 104 determines whether the permissions 138 allow the tools 134 access to the auxiliary power source 132. If so, control passes to operation 810 to activate the auxiliary power source 132. If not, control passes to operation 812 to deactivate the auxiliary power source 132. After operations 810 or 812, the process 800 ends.

Figure 9:
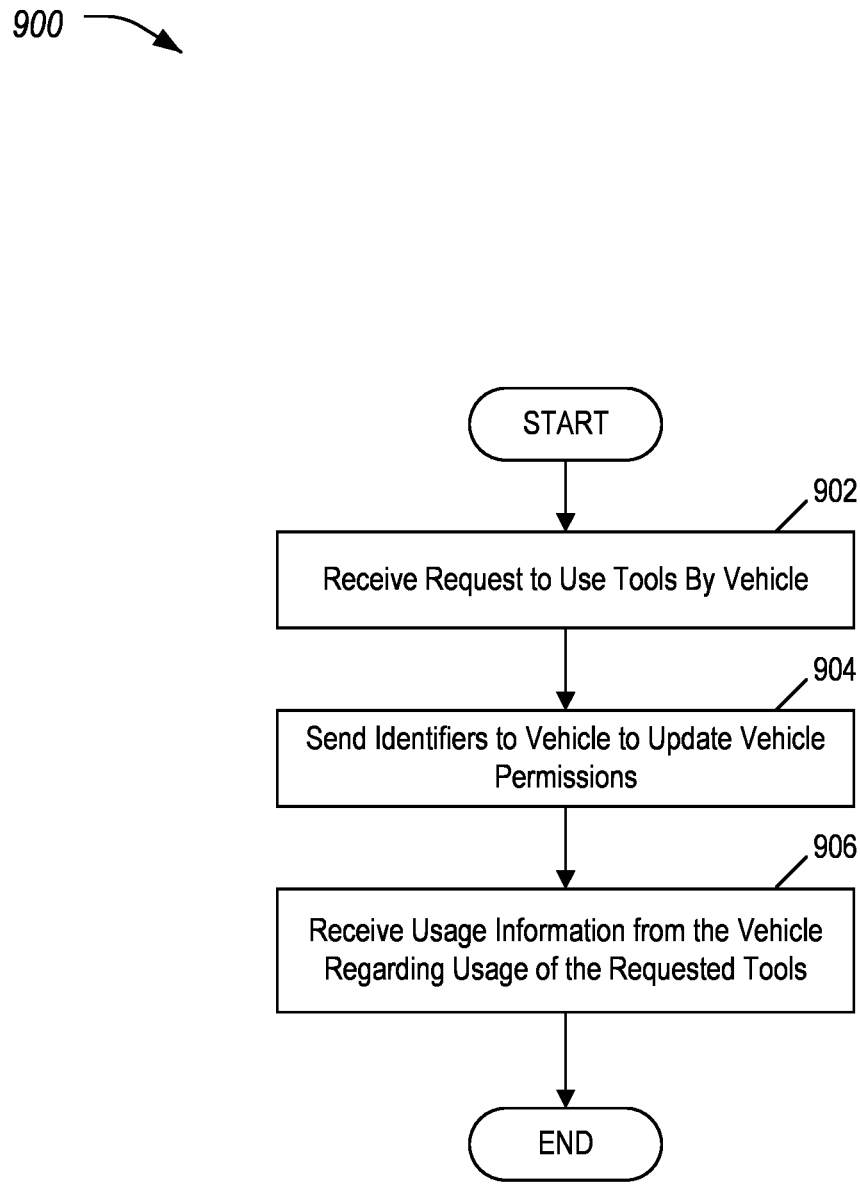
FIG. 9 illustrates an example process for operation of the cloud server to authorize operation of the tools for a vehicle.

FIG. 9 illustrates an example process 900 for operation of the cloud server 128 to authorize operation of the tools 134 for a vehicle 102. In an example, the process 900 may be performed by the cloud server 128 in the context of the components of the system 100.

At operation 902, the cloud server 128 receives a request to use tools 134 by a vehicle 102. In an example, the cloud server 128 may receive a request sent from a mobile device 118 requesting that a vehicle 102 be allowed to utilize one or more tools 134 via the auxiliary power source 132 of the vehicle 102. In another example, the request may be sent from the vehicle 102 itself. In yet a further example, the request may be sent from another system to the cloud server 128 such as from a fleet management system under which the vehicle 102 operates.

At operation 904, the cloud server 128 sends identifiers to the vehicle 102 to allow the vehicle 102 to update the permissions 138 maintained by the vehicle 102. In an example the cloud server 128 may send identifiers of the tools 134 that are authorized to be powered by the vehicle 102 via the auxiliary power source 132. In another example, the cloud server 128 may send identifier of the access devices 110 that are authorized to enable the auxiliary power source 132 to power the tool 134. Or, the authorized access device 110 may be the access device 110 having sent the request at operation 902, in another example, such as an administrator access device 110 of the vehicle 102. This information may be used by the vehicle 102 to update the permissions 138. By using the permissions 138, the tools 134 may be powered by the auxiliary power sources 132, such as discussed above with respect to the process 800.

At operation 906, the cloud server 128 receives usage 702 information from the vehicle 102 for the tools 134. In an example, the vehicle 102 may send, to the cloud server 128, the usage 702 information to inform the cloud server 128 of the actual usage of the tool 134 in context of being powered by the auxiliary power sources 132 of the vehicle 102. After operation 906, the process 900 ends.

Thus, auxiliary power sources 132 used on sites for running power tools 134 may be used to enforce the presence of access devices 110 to control power output. By utilizing sophisticated PEPS and PaaK features found in vehicles 102 that contain auxiliary power sources 132, power output may gain flexible permissions 138 controlled by a foreman or other administrative user to enforce safety guidelines. Further, if the tools 134 include intelligent communications features, additional applications with the vehicle 102 can utilize the connectivity to enhance tool 134 operation.

Figure 10:
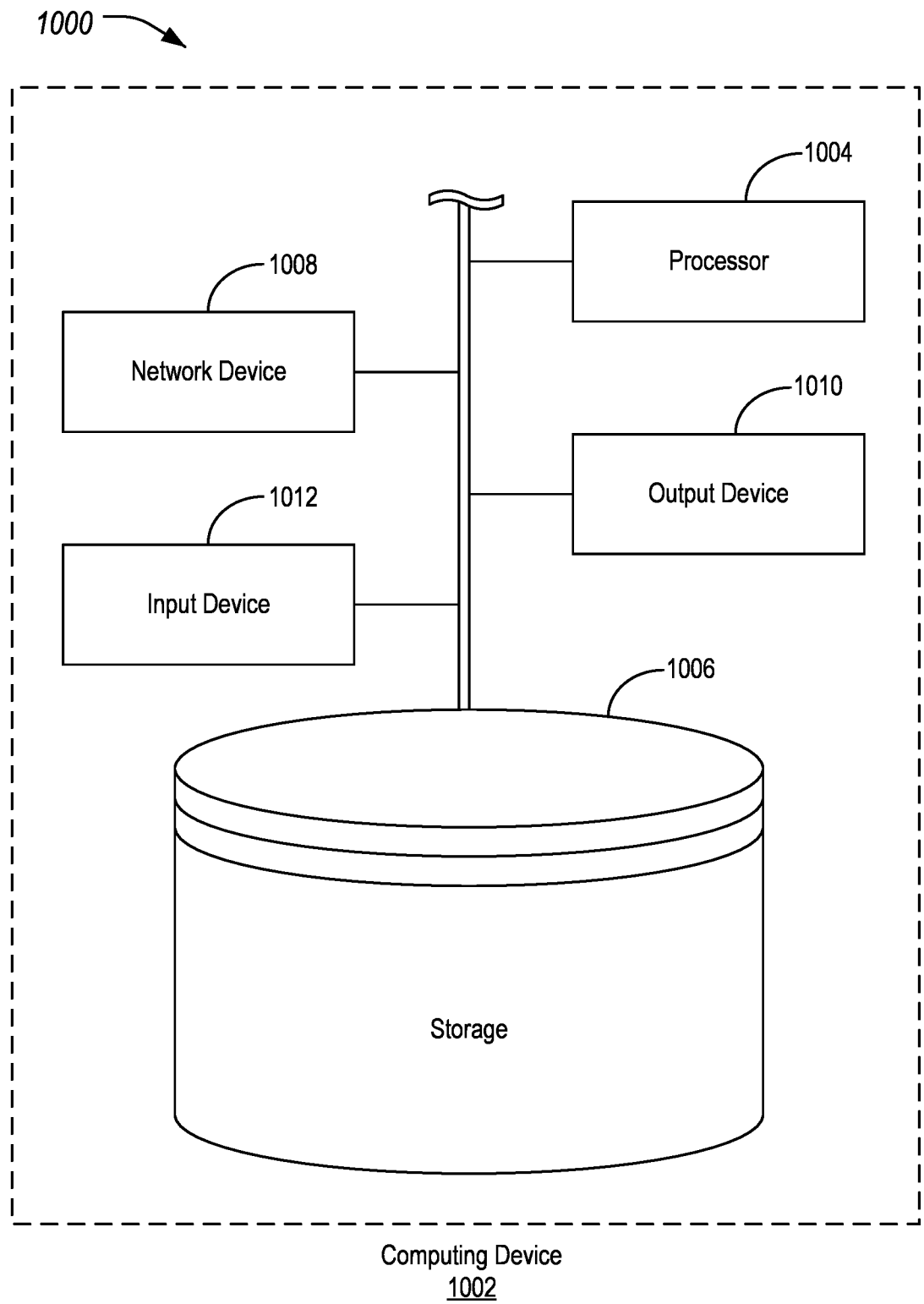
FIG. 10 illustrates an example computing device for mesh device communication.

FIG. 10 illustrates an example 1000 of a computing device 1002 for mesh device communication. Referring to FIG. 10, and with reference to FIGS. 1-9, the hardware performing the operations of the vehicles 102, access devices 110, and cloud servers 128 may include examples of such a computing device 1002. As shown, the computing device 1002 may include a processor 1004 that is operatively connected to a storage 1006, a network device 1008, an output device 1010, and an input device 1012. It should be noted that this is merely an example, and computing devices 1002 with more, fewer, or different components may be used.

The processor 1004 may include one or more integrated circuits that implement the functionality of a central processing unit (CPU) and/or graphics processing unit (GPU). In some examples, the processors 1004 are a system on a chip (SoC) that integrates the functionality of the CPU and GPU. The SoC may optionally include other components such as, for example, the storage 1006 and the network device 1008 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 1004 executes stored program instructions that are retrieved from the storage 1006. The stored program instructions, accordingly, include software that controls the operation of the processors 1004 to perform the operations described herein. The storage 1006 may include both non-volatile memory and volatile memory devices. The non-volatile memory includes solid-state memories, such as negative-AND (NAND) flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least 2D and optionally 3D graphics to the output device 1010. The output device 1010 may include a graphical or visual display device, such as an electronic display screen, projector, printer, or any other suitable device that reproduces a graphical display. As another example, the output device 1010 may include an audio device, such as a loudspeaker or headphone. As yet a further example, the output device 1010 may include a tactile device, such as a mechanically raiseable device that may, in an example, be configured to display braille or another physical output that may be touched to provide information to a user.

The input device 1012 may include any of various devices that enable the computing device 1002 to receive control input from users. Examples of suitable input devices 1012 that receive human interface inputs may include keyboards, mice, trackballs, touchscreens, voice inputs, graphics tablets, and the like.

The network devices 1008 may each include any of various devices that enable computing device 1002 to send and/or receive data from external devices over networks. Examples of suitable network devices 1008 include an Ethernet interface, a Wi-Fi transceiver, a cellular transceiver, or a BLUETOOTH or BLE transceiver, or other network adapter or peripheral interconnection device that receives data from another computer or external data storage device, which can be useful for receiving large sets of data in an efficient manner.

Computing devices 1002 described herein generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, JavaScript, Python, Perl, structured query language (SQL), etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for enhancing operation of powered tools, comprising:
   a memory of a vehicle configured to store access permissions for tools and access devices;
   an auxiliary power source of the vehicle configured to provide power the tools; and
   a controller of the vehicle, programmed to
   detect presence of a tool within proximity to the vehicle,
   detect presence of access devices configured to provide access to the vehicle, utilizing passive access functionality of the vehicle, and
   allow access to the auxiliary power source for powering the tool responsive to the access permissions granting access due to the presence of the access devices.

2. The system of claim 1, wherein the access devices include one or more passive entry key fobs.

3. The system of claim 1, wherein the access devices include one or more mobile phones.

4. The system of claim 1, wherein the presence of the tool is detected over a wired power connection between the tool and the auxiliary power source.

5. The system of claim 1, wherein the presence of the tool is detected over a wireless signal independent of a wired power connection between the tool and the auxiliary power source.

6. The system of claim 1, wherein the access permissions indicate that a plurality of access devices are to be within the proximity to the vehicle, and the controller is further programmed to:
   responsive to the controller detecting presence of the plurality of access devices, allow the access to the auxiliary power source; and
   responsive to the controller lacking to detect the presence of the plurality of access devices, prevent the access to the auxiliary power source.

7. The system of claim 6, wherein the access permissions indicate that the plurality of access devices are to be within the proximity to the vehicle, and the controller is further programmed to:
   responsive to the controller detecting presence of an administrator access device, allow the access to the auxiliary power source regardless of whether the plurality of access devices are detected.

8. The system of claim 1, wherein the controller is further programmed to:
   receive, from the tool, information indicative of a state of charge of a tool battery of the tool; and
   send, to one or more of the access devices, charging information indicating the state of charge.

9. The system of claim 1, wherein the controller is further programmed to:
   receive, from a cloud server, identifiers of which of the powered tools can be charged by the vehicle;
   receive, from the tool, a tool identifier of the tool;
   allow access to the auxiliary power source for powering the tool responsive to the tool identifier matching the identifiers of which of the powered tools can be charged by the vehicle;
   receive, from the tool, usage information indicative of usage of the tool; and
   send, to the cloud server, the usage information to inform the cloud server of the usage of the tool in context of the vehicle.

10. A method for enhancing operation of powered tools, comprising:
    storing access permissions for tools and access devices to a memory of a vehicle;
    detecting presence of a tool within proximity to the vehicle;
    detecting presence of access devices configured to provide access to the vehicle, utilizing passive access functionality of the vehicle; and
    allowing access to an auxiliary power source of the vehicle for powering the tool responsive to the access permissions granting access due to the presence of the access devices.

11. The method of claim 10, wherein the access devices include one or more passive entry key fobs.

12. The method of claim 10, wherein the access devices include one or more mobile phones.

13. The method of claim 10, further comprising detecting the presence of the tool over a wired power connection between the tool and the auxiliary power source.

14. The method of claim 10, further comprising detecting the presence of the tool over a wireless signal independent of a wired power connection between the tool and the auxiliary power source.

15. The method of claim 10, wherein the access permissions indicate that a plurality of access devices are to be within the proximity to the vehicle, and further comprising:
    responsive to detecting presence of the plurality of access devices, allowing the access to the auxiliary power source; and
    responsive to lacking to detect the presence of the plurality of access devices, preventing the access to the auxiliary power source.

16. The method of claim 15, wherein the access permissions indicate that the plurality of access devices are to be within the proximity to the vehicle, and further comprising:
    responsive to detecting presence of an administrator access device, allowing the access to the auxiliary power source regardless of whether the plurality of access devices are detected.

17. The method of claim 10, further comprising:
    receiving, from the tool, information indicative of a state of charge of a tool battery of the tool; and sending, to one or more of the access devices, charging information indicating the state of charge.

18. The method of claim 10, further comprising:
receiving, from a cloud server, identifiers of which of the powered tools can be charged by the vehicle;
receiving, from the tool, a tool identifier of the tool;
allowing access to the auxiliary power source for powering the tool responsive to the tool identifier matching the identifiers of which of the powered tools can be charged by the vehicle;
receiving, from the tool, usage information indicative of usage of the tool; and
sending, to the cloud server, the usage information to inform the cloud server of the usage of the tool in context of the vehicle.

19. A non-transitory computer-readable medium comprising instructions for enhancing operation of powered tools that, when executed by a controller of a vehicle, cause the vehicle to perform operations including to:
store access permissions for tools and access devices to a memory of a vehicle;
detect presence of a tool within proximity to the vehicle;
detect presence of access devices configured to provide access to the vehicle, utilizing passive access functionality of the vehicle; and
allow access to an auxiliary power source of the vehicle for powering the tool responsive to the access permissions granting access due to the presence of the access devices.

20. The medium of claim 19, further comprising instructions that, when executed by the controller of the vehicle, cause the vehicle to perform operations including to:
receive, from a cloud server, identifiers of which of the powered tools can be charged by the vehicle;
receive, from the tool, a tool identifier of the tool;
allow access to the auxiliary power source for powering the tool responsive to the tool identifier matching the identifiers of which of the powered tools can be charged by the vehicle;
receive, from the tool, usage information indicative of usage of the tool; and
send, to the cloud server, the usage information to inform the cloud server of the usage of the tool in context of the vehicle.

* * * * *